United States Patent [19]

Kluger et al.

[11] Patent Number: 4,599,355

[45] Date of Patent: Jul. 8, 1986

[54] TREATMENT OF SLEEP DISORDERS

[75] Inventors: Ronald Kluger, Don Mills; Mortimer Mamelak, Willowdale, both of Canada

[73] Assignee: University of Toronto - Innovations Foundation, Toronto, Canada

[21] Appl. No.: 637,882

[22] Filed: Aug. 6, 1984

[30] Foreign Application Priority Data

Feb. 10, 1984 [JP] Japan ................................. 59-23599

[51] Int. Cl.[4] ........................................... A61K 31/235
[52] U.S. Cl. ................................................... 514/533
[58] Field of Search ................. 424/311, 308; 514/533

[56] References Cited

PUBLICATIONS

Chem. Abst. 93-148042f, (1980).
Wine Aroma Composition: Identification of Additional Volatile Constituents of Red Wine, *J. Agric. Food Chem.*, vol. 28, pp. 926-928, (1980).

*Primary Examiner*—Stanley J. Friedman
*Attorney, Agent, or Firm*—Lyon & Lyon

[57] ABSTRACT

Sleep disorders in mammals, such as insomnia and narcolepsy, are treated by administering an effective amount of ethyl 4-acetoxybutanoate, or a closely related homolog thereof.

3 Claims, No Drawings

TREATMENT OF SLEEP DISORDERS

FIELD OF THE INVENTION

This invention relates to treatment of sleep disorders, and chemotherapeutic compounds and compositions useful therein.

BACKGROUND OF THE INVENTION

Sleep disorders are a problem in a large portion of the population. Narcolepsy and insomnia are widely occurring. Safe, non-addictive and long-lasting drugs that are effective are substantially unavailable. Each class of drug currently used for this purpose has major drawbacks. For example, barbiturates have addictive tendencies, act as depressants on the central nervous system, and can be lethal in improper dosages. Benzodiazepines are less effective, and tend to lose their sedative effect with continued use. Gammahydroxybutyrate is effective in treatment of narcolepsy, and is a very powerful muscle relaxant, but is of only short duration of action, e.g. 2-3 hours. This is a major drawback, since the patient needs to be continually re-awakened for further dosages.

The present invention provides compounds and compositions for use in treatment of sleep disorders such as narcolepsy and insomnia, that will have sufficiently long duration of action to overcome this serious disadvantage. The chemical compounds correspond to the general formula:

$$R.CO.O.X.CO.O.R^1$$

where X is a linear methylene chain of from 3–5 carbon atoms in length, R is selected from lower alkyl groups, aryl and aralkyl groups of 7–12 carbon atoms, and $R^1$ is selected from lower alkyl groups and benzyl group.

Typical and preferred among the compounds used in the present invention is ethyl 4-acetoxybutanoate of formula:

$$CH_3.CO.O.CH_2.CH_2.CH_2.CO.O.C_2H_5$$

Accordingly, the invention will be further described with reference to that specific compound.

From one aspect ethyl 4-acetoxybutanoate may be regarded as a chemically modified and chemically protected form of gammahydroxybutanoate, with the acid and hydroxyl functions thereof protected. Gammahydroxybutanoate has been demonstrated in clinical trials to be a safe, oral drug for treatment of narcolepsy and as a powerful muscle relaxant. However, its effects are of too short a duration, due to its lack of bio-availability. It is possible, that, after entry into the cell, the compound ethyl 4-acetoxybutanoate of the invention slowly hydrolyses to form gammahydroxybutanoate or a similar compound in situ, to exercise the therapeutic effects thereof over a longer period of time. In any event, it has been found that ethyl 4-acetoxybutanoate has a much longer lasting effect, at equivalent dosage levels, than gammahydroxybutanoate. This makes it a far more effective treatment for narcolepsy than anything heretofore available. Indeed, the effect is so markedly longer lasting that ethyl 4-acetoxybutanoate shows potential for treatment of patients having conditions or disorders where gammahydroxybutanoate is of little or no use. In cases of chronic insomnia, for example, sufficient dosages of the present compound can be administered to maintain sleep throughout the night, without incurring the development of tolerance or withdrawal side effects. Currently available chemotherapeutic agents will not do this. The compound of the present invention constitutes a safe and powerful hypnotic, for administration to a patient each night. The compound is also a powerful muscle relaxant for use in the treatment of a variety of conditions involving muscle spasticity.

In addition, there is evidence to suggest that ethyl 4-acetoxybutanoate inhibits the release of dopamine in the brain, indicating that it is potentially useful as an anti-Parkinsonian drug, an anti-schizophrenia drug, and an anti-psychosis drug in cases where the psychosis is associated with dopamine release and activity.

A large dose can have an extremely long duration of action (up to 12 hours) without toxic consequences. The duration of action can be controlled by the size of the dosage.

The drug ethyl 4-acetoxybutanoate according to the present invention may be compounded and administered in dosage levels similar to those commonly used for gammahydroxybutanoate (sodium oxybate, sold under the trade names "Anetamine" and "Somsanit"). Thus it may be orally administered as capsules, in admixture with the usual flavorants, excipients, carriers or the like. It may be taken orally as a solution or emulsion. It may be injected intraperitoneally or parenterally as a sterile buffered solution or emulsion e.g. in physiological saline. Amounts of the order of 10–100 mg per kilogram animal body weight, per nightly dosage, appears suitable in humans, with larger doses in animal use.

The compounds used in the present invention may be synthesized from the appropriate lactone, by reaction thereof with the appropriate alkanol, under acid conditions. Thus, for the preparation of ethyl 4-acetoxybutanoate, butyrolactone is reacted with ethanol suitably in the presence of sulphuric acid. Similar procedures employing methanol instead of ethanol yields the methyl ester. An alternative synthesis involves the reaction of the appropriate carboxylic acid salt with a 4-halo-ester. Thus, by this procedure, ethyl 4-acetoxybutanoate may be prepared by reaction of ethyl 4-chlorobutanoate with acetic anhydride.

Alternative synthetic methods may be based on those in the published literature e.g.

Wright, "JACS", 63 1281 (1941);
Meerwein, "Berichte" 89 2060 (1956).

The invention is further described and illustrated in the following specific examples.

EXAMPLE 1—PREPARATION OF 4-0-ACETYL-4-HYDROXYBUTANOATE

Eighty grams of butyrolactone was dissolved in 500 ml abs ethanol containing 8 ml conc sulfuric acid in a 250 ml erlenmeyer flask. After 7 days, 10 g sodium carbonate was added slowly followed by 20 g anhydrous sodium sulfate. The solution was filtered and the filtrate was combined with 300 ml water. The solution was extracted with three 200 ml portions of chloroform. The chloroform extracts were dried over magnesium sulfate, then concentrated by rotary evaporation. The residue was placed in a 1 liter flask and treated with 80 g acetic anhydride 100 ml pyridine, cooled in an ice bath. After addition was complete, the ice was removed and the stoppered flask was left at room temp overnight. A solution of 100 ml conc HCl and 200 ml water and 100 g of ice was added. Two layers formed. The aqueous layer was extracted with three 100 ml portions of chloroform. The nonaqueous layer was taken up in chloroform and combined with the extracts. The extract was treated carefully with saturated aqueous sodium bicarbonate then with saturated sodium chloride solution then dried over magnesium sulfate. The dried solution was concentrated then distilled. The fraction boiling at 56° C., 0.025 torr, was collected and shown by nmr spectroscopy to be pure ethyl 4-0-acetyl hydroxybutanoate (41 g).

By repeating the above procedure, but substituting methanol for ethanol, methyl 4-0-acetylhydroxybutanoate was similarly prepared.

EXAMPLE 2—PREPARATION OF METHYL 4-0-ACETYL-4-HYDROXYBUTANOATE

To a 500 ml round bottom flask, equipped with teflax apparatus, 14.7 g (0.15 ml) of potassium acetate was dissolved in 185 ml acetic anhydride. 1.87 g potassium iodide (0.0113 mol) was subsequently dissolved into this heterogeneous mixture. After addition of 18.3 ml (0.15 mol) of methyl 4-chlorobutanoate, the mixture was refluxed gently for 24 hours. Upon completion of reflux, the apparatus was allowed to cool slowly to room temperature and the precipitate was removed via suction filtration (15 Torr) and washed with ethyl acetate. After rotary evaporation (15 Torr), distillation under vacuum (1.5 Torr) of the orange solution yielded three fractions:

(1) Acetic anydride, 35–40° C.;
(2) Acetic anhydrice+product, 41°–80° C.
(3) Product 81°–92° C. (levelled off at 92° C.).

Fraction 2 was redistilled and combined with (3) to give 22.96 g of methyl ethyl 4-acetoxybutanoate (96% of theoretical).

EXAMPLE 3—PREPARATION OF METHYL 4-BENZOYLBUTANOATE 21.6 g (0.15 mol) of sodium benzoate was added slowly with stirring to 240 dimethyl formahide in a 500 ml round bottom flask. Upon addition of 1.87 g (0.0113 mol) potassium iodide followed by 18.3 ml (0.15 mol) of methyl 4-chlorobutanoate the mixture was refluxed gently for 24 hours. After reflux the reaction vessel was allowed to cool slowly to room temperature and the precipitate was removed via suction filtration (15 Torr) and washed with ethyl acetate. After rotary evaporation (15 Torr) to remove ethyl acetate distillation under vacuum yielded three distinct fractions:

(1) DMF at 35° C.
(2) DMF at 65°–72° C.
(3) Product 110°–150° C. (levelled off at 148° C.).

During the collection of the product, the condense had to be turned off in order to avoid crystallization of the product. The yield of methyl 4-benzoyl butanoate was 26.86 g (80.6% of theoretical yield).

EXAMPLE 4

The preferred compound according to the invention was administered to laboratory rats, and the sleep of the animals induced by the drug was tracked by means of an electroencephalograph.

Compound ethyl 4-acetoxybutanoate, administered by mouth at a dosage of 250 mg per kilogram body weight induced sleep for 1 hour 28 minutes. At a dosage of 500 mg per kilogram administered in one case by mouth and in another case intraperitoneally, sleep was induced for 4 hours.

By contrast, the administration to a similar laboratory rat, intraperitoneally, of a dosage of 500 mg per kilogram body weight of gamma hydroxybutyrate induced sleep for only 1 hour 59 minutes.

We claim:

1. A process of treating sleep disorders in mammals, which comprises administering to a mammal an effective amount of a pharmaceutical composition containing as active ingredient a compound selected from ethyl 4-acetoxybutanoate; methyl 4-acetoxybutanoate; or methyl 4-benzoylbutanoate.

2. The process of claim 1 wherein the compound is ethyl 4-acetoxybutanoate.

3. The process of claim 1 wherein the composition is administered at a dosage of from about 10 mg to about 100 mg per kilogram mammal body weight.

* * * * *